(12) United States Patent
Jahnke

(10) Patent No.: US 10,566,639 B2
(45) Date of Patent: Feb. 18, 2020

(54) CARBON DIOXIDE SEQUESTRATION USING MOLTEN CARBONATE FUEL CELL AND HYDROGEN SEPARATION TECHNOLOGY

(71) Applicant: FuelCell Energy, Inc., Danbury, CT (US)

(72) Inventor: Fred C. Jahnke, Rye, NY (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 16/096,835

(22) PCT Filed: Apr. 26, 2017

(86) PCT No.: PCT/US2017/029726
§ 371 (c)(1),
(2) Date: Oct. 26, 2018

(87) PCT Pub. No.: WO2017/189785
PCT Pub. Date: Nov. 2, 2017

(65) Prior Publication Data
US 2019/0131645 A1 May 2, 2019

Related U.S. Application Data

(60) Provisional application No. 62/328,395, filed on Apr. 27, 2016.

(51) Int. Cl.
*H01M 8/06* (2016.01)
*B01D 53/32* (2006.01)
(Continued)

(52) U.S. Cl.
CPC ........ *H01M 8/0668* (2013.01); *B01D 53/326* (2013.01); *H01M 8/04014* (2013.01);
(Continued)

(58) Field of Classification Search
CPC .. H01M 8/0668; B01D 53/326; B01D 53/047
See application file for complete search history.

(56) References Cited

U.S. PATENT DOCUMENTS

| 5,198,311 A | 3/1993 | Nakazawa et al. |
| 2005/0008924 A1 | 1/2005 | Malhotra |

(Continued)

FOREIGN PATENT DOCUMENTS

| CN | 104847424 A | 8/2015 |
| WO | WO-2015/116964 A1 | 8/2015 |

OTHER PUBLICATIONS

International Search Report and Written Opinion in PCT/US2017/029726, dated Sep. 22, 2018 (10 pages).

*Primary Examiner* — Robert A Hopkins
(74) *Attorney, Agent, or Firm* — Foley & Lardner LLP

(57) ABSTRACT

A carbon dioxide capture system includes a fuel cell assembly comprising an anode section and a cathode section; an electrochemical hydrogen separator (EHS) configured to receive an anode exhaust stream from the anode section of the fuel cell assembly, and generate a first EHS output stream comprising hydrogen, and a second EHS output stream comprising concentrated carbon dioxide; and a liquid-vapor separator (LVS) configured to receive the second EHS output stream, and separate the second EHS output stream into a first LVS output stream comprising liquid carbon dioxide, and a second LVS output stream comprising non-condensable gases in the second EHS output stream and carbon dioxide vapor.

16 Claims, 3 Drawing Sheets

(51) Int. Cl.
*H01M 8/0668* (2016.01)
*H01M 8/0656* (2016.01)
*H01M 8/0606* (2016.01)
*H01M 8/04014* (2016.01)
*H01M 8/04089* (2016.01)
*H01M 8/04701* (2016.01)
*H01M 8/0612* (2016.01)
*H01M 8/0662* (2016.01)
*H01M 8/14* (2006.01)

(52) U.S. Cl.
CPC ... *H01M 8/04097* (2013.01); *H01M 8/04716* (2013.01); *H01M 8/0606* (2013.01); *H01M 8/0612* (2013.01); *H01M 8/0656* (2013.01); *H01M 8/0681* (2013.01); *H01M 8/145* (2013.01); *H01M 2008/147* (2013.01)

(56) References Cited

U.S. PATENT DOCUMENTS

2013/0108936 A1    5/2013   McElroy et al.
2014/0332405 A1   11/2014   Tamhankar et al.
2019/0140295 A1*   5/2019   Ghezel-Ayagh .... H01M 8/0668

* cited by examiner

CARBON DIOXIDE SEQUESTRATION USING MOLTEN CARBONATE FUEL CELL AND HYDROGEN SEPARATION TECHNOLOGY

CROSS-REFERENCE TO RELATED APPLICATIONS

The present application is a U.S. national stage entry of PCT/US2017/029726, filed on Apr. 26, 2017, which claims priority to U.S. Provisional Appl. No. 62/328,395, filed on Apr. 27, 2016, which are hereby incorporated by reference in their entireties.

BACKGROUND

The present disclosure relates to separating concentrated $CO_2$ from anode exhaust gas of a fuel cell in the form of liquid $CO_2$ and/or liquid fuel. In particular, the present disclosure relates to a fuel cell system having an electrochemical hydrogen separator for concentrating the $CO_2$ by removing hydrogen from the anode exhaust gas.

Current solutions for sequestering $CO_2$ are capital and energy intensive. Further, these solutions do not co-produce a hydrogen stream from anode exhaust gas. It would be advantageous to provide an efficient and cost-effective system that can effectively separate $CO_2$ while also generating hydrogen. Efficiency in the fuel cell system may also be improved by feeding the remaining gas to the fuel cell cathode after the separation of $CO_2$ and hydrogen.

SUMMARY

In one embodiment, a carbon dioxide capture system comprises: a fuel cell assembly comprising an anode section and a cathode section; an electrochemical hydrogen separator (EHS) configured to receive an anode exhaust stream from the anode section of the fuel cell assembly, to generate a first EHS output stream comprising hydrogen, and to generate a second EHS output stream comprising concentrated carbon dioxide; and a liquid-vapor separator (LVS) configured to receive the second EHS output stream, and separate the second EHS output stream into a first LVS output stream comprising liquid carbon dioxide, and a second LVS output stream comprising non-condensable gas and carbon dioxide vapor.

In one aspect of this embodiment, the anode exhaust stream is compressed before being received by the EHS, such that the first EHS output stream comprises high pressure hydrogen and the second EHS output stream comprises high pressure concentrated carbon dioxide.

In one aspect of this embodiment, the anode exhaust stream is received by the EHS at low pressure and the second EHS output stream is compressed.

In one aspect of this embodiment, the carbon dioxide capture system further comprises a first heat exchanger configured to receive the second EHS output stream and the second LVS output stream, to cool the second EHS output stream, and to heat the second LVS output stream; and a second heat exchanger configured to receive the cooled second EHS output stream from the first heat exchanger and to further cool the second EHS output stream. The LVS is configured to receive the cooled second EHS output stream from the second heat exchanger.

In one aspect of this embodiment, the carbon dioxide capture system further comprises a third heat exchanger configured to receive the heated second LVS output stream from the first heat exchanger and to further heat the second LVS output stream.

In one aspect of this embodiment, the carbon dioxide capture system further comprises a fourth heat exchanger configured to receive the heated second LVS output stream from the third heat exchanger and further heat the second LVS output stream.

In one aspect of this embodiment, the carbon dioxide capture system further comprises an expander configured to expand the heated second LVS output stream.

In one aspect of this embodiment, the carbon dioxide capture system further comprises an anode gas oxidizer (AGO) combustor configured to receive the expanded second LVS output stream, oxidize the expanded second LVS output stream, and provide an AGO output stream to the cathode section of the fuel cell assembly.

In one aspect of this embodiment, the AGO combustor is configured to receive a cathode exhaust stream from the fuel cell assembly.

In one aspect of this embodiment, the system comprises the fourth heat exchanger; and the fourth heat exchanger is configured to further heat the second LVS output stream using the AGO output stream.

In one aspect of this embodiment, the carbon dioxide capture system further comprises a plurality of compressors and a plurality of heat exchangers that are alternately disposed and configured to receive the anode exhaust stream from the anode section of the fuel cell assembly, and to compress and cool the anode exhaust stream before the anode exhaust stream is received by the EHS.

In one aspect of this embodiment, the carbon dioxide capture system further comprises a plurality of compressors and a plurality of heat exchangers that are alternately disposed and configured to receive the anode exhaust stream from the anode section of the fuel cell assembly, and to compress and cool the anode exhaust stream after the anode exhaust stream is received by the EHS.

In one aspect of this embodiment, the carbon dioxide capture system further comprises a fossil fuel power plant configured to generate a flue gas, wherein the cathode section of the fuel cell assembly is configured to receive the flue gas from the fossil fuel power plant.

In one aspect of this embodiment, the carbon dioxide capture system further comprises a fuel cell power plant comprising an anode section and a cathode section, wherein the cathode section of the fuel cell assembly is configured to receive a cathode exhaust stream from the cathode section of the fuel cell power plant.

In another embodiment, a liquid fuel generation system comprises: a fuel cell assembly comprising an anode section and a cathode section; an electrochemical hydrogen separator (EHS) configured to receive a first portion of an anode exhaust stream from the anode section of the fuel cell assembly, to generate a first EHS output stream comprising high pressure hydrogen, and to generate a second EHS output stream comprising high pressure concentrated carbon dioxide; and a liquid fuel production assembly configured to receive a second portion of the anode exhaust stream and the first EHS output stream, and generate a liquid fuel.

In one aspect of this embodiment, the liquid fuel generation system further comprises a heat exchanger configured to heat the second EHS output stream.

In one aspect of this embodiment, the liquid fuel generation system further comprises an expander configured to expand the heated second EHS output stream.

In one aspect of this embodiment, the liquid fuel generation system further comprises an anode gas oxidizer (AGO) combustor configured to receive the expanded second EHS output stream, oxidize the expanded EHS output stream, and provide an AGO output stream to the cathode section of the fuel cell assembly.

In one aspect of this embodiment, the AGO combustor is configured to receive a cathode exhaust stream from the fuel cell assembly.

In one aspect of this embodiment, the heat exchanger is configured to heat the second LVS output stream using the AGO output stream before the second LVS output stream is sent to an expander.

In one aspect of this embodiment, the liquid fuel generation system further comprises a plurality of compressors and a plurality of heat exchangers that are alternately disposed and configured to receive the anode exhaust stream from the anode section of the fuel cell assembly, and compress and cool the anode exhaust stream before the anode exhaust stream is received by the EHS.

These and other advantageous features will become apparent to those reviewing the disclosure and drawings.

DETAILED DESCRIPTION

Referring generally to the figures, disclosed herein is a fuel cell system capable of sequestering $CO_2$ from anode exhaust gas outputted by a high-temperature fuel cell.

Figure 1:
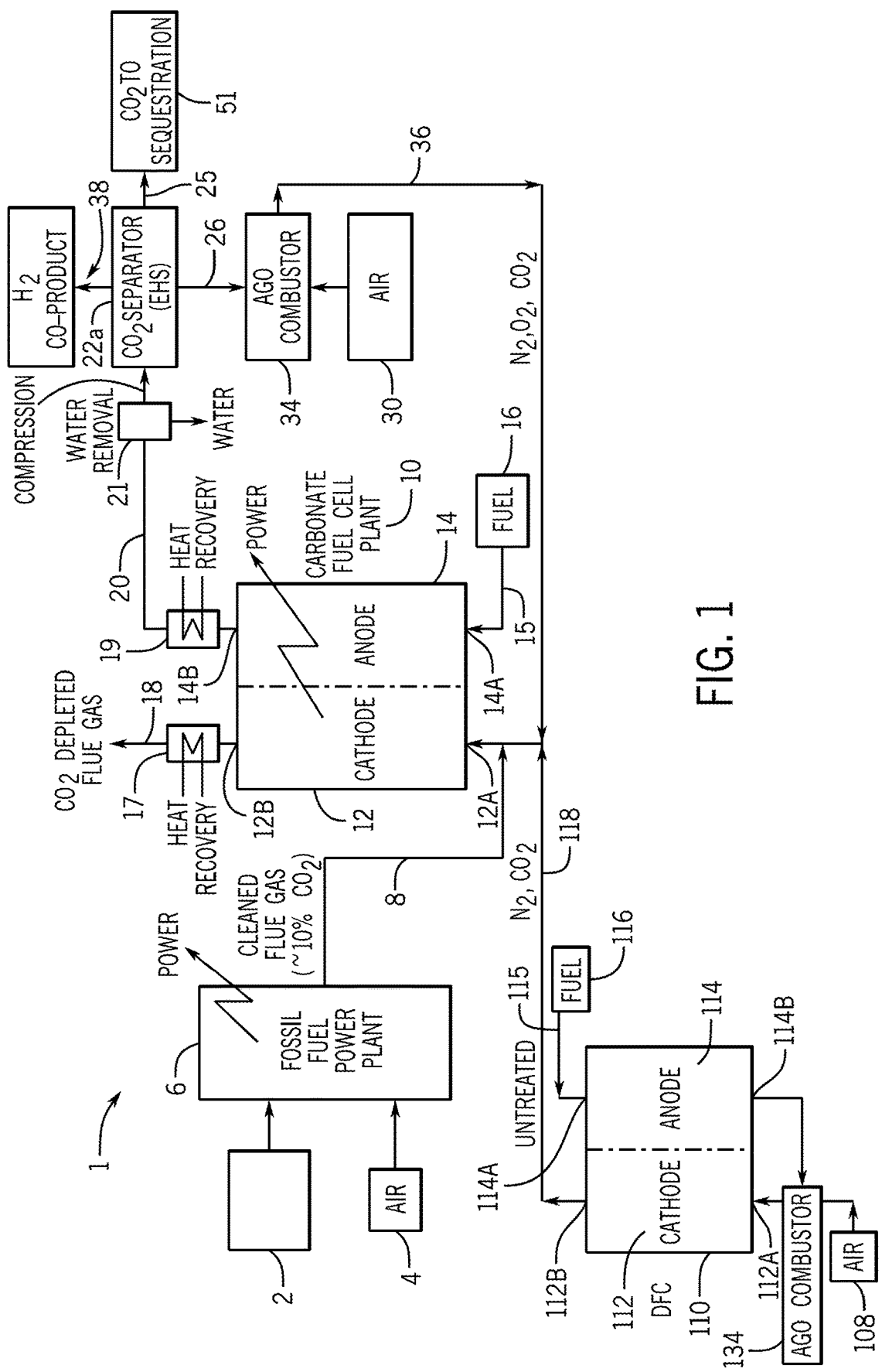
FIG. 1 shows a schematic view of a fuel cell system incorporating $CO_2$ sequestration.

Referring now to FIG. 1 a fuel cell system 1 is shown according to one embodiment. The system 1 includes a fossil fuel power plant 6, a fuel cell assembly 10 (i.e., a first fuel cell assembly) having a cathode 12 and an anode 14, and a second fuel cell assembly 110 (i.e., a fuel cell power plant). The anode 14 receives fuel (e.g., coal gas, natural gas or other hydrogen-containing fuel) from a fuel supply 16. The fuel is delivered through a line 15 to an inlet 14A of the anode 14. As shown, the fuel cell assembly 10 is an internally reforming direct molten carbonate fuel cell in which the fuel for the anode 14 is internally reformed in the fuel cell assembly 10. However, in other embodiments, the fuel cell assembly 10 may include an externally-reforming carbonate fuel cell assembly. In this configuration, a reformer is disposed between the fuel supply 16 and the inlet 14A of the anode 14 and is configured to reform the fuel prior to delivery to the anode 14.

The cathode 12 is supplied with flue exhaust gas (i.e., flue gas) from the power plant 6 and/or flue gas from the second fuel cell assembly 110. The arrangement with the second fuel cell assembly 110 will be discussed in greater detail below. Use of one or both of the power plant 6 and the second fuel cell assembly 110 in the system 1 may be optional, although the inclusion of each increases the amount of $CO_2$ that may be captured by the system 1. Without the power plant 6 and the second fuel cell assembly 110, the $CO_2$ capture may be limited to the carbon in fuel fed to the first fuel cell assembly 10.

As shown in FIG. 1, fossil fuel (e.g., coal, natural gas or other hydrocarbon fuel) is delivered to the fossil fuel power plant 6 from a fossil fuel supply 2 along with air delivered from an air supply 4. The power plant 6 combusts the fossil fuel and air, producing power and outputting flue gas to a line 8. The flue gas typically comprises approximately 10% $CO_2$, 7% water, and 4% oxygen, with the balance being nitrogen. However, the exact amounts of these components may depend upon the type of fossil fuel provided by the fossil fuel supply 2 and the amount of air provided from the air supply 4. An oxygen content (e.g., percentage of oxygen in the stream) in the flue gas may be varied (e.g., controlled) by adjusting the amount (e.g., flow rate) of air provided to the power plant 6 from the air supply 4.

The line 8 is fluidly coupled to an inlet 12A of the cathode 12, such that the line 8 controls the flow of flue gas to the cathode 12. Flow of flue gas through the line 8 may be controlled, such that all, none, or a portion of the flue gas is received at the cathode 12. In this configuration, flue gas may be the exclusive oxidant gas supplied to the cathode 12 at the inlet 12A. The flue gas may be cleaned (e.g., to remove sulfur or other particulates) before being introduced to the cathode 12.

The flue gas in the cathode 12 and the reformed hydrogen in the anode 14 are reacted in the first fuel cell assembly 10 through an electrochemical reaction, such that the first fuel cell assembly 10 outputs power. This electrochemical reaction results in a substantial portion (e.g., approximately 65% to 85% or more) of the $CO_2$ in the flue gas being transferred from the cathode 12 to the anode 14 of the first fuel cell assembly 10.

More particularly, the $CO_2$ and oxygen in the flue gas react in the cathode 12 to produce carbonate ions which are then carried to the anode 14 of the first fuel cell assembly 10 through a fuel cell electrolyte. At the anode 14, the carbonate ions are reduced with hydrogen from the fuel to produce water and $CO_2$. The net result is the above-mentioned transfer of a substantial portion of the $CO_2$ in the flue gas from the cathode 12 to the anode 14. Anode exhaust gas at the outlet 14B of the anode 14 of the first fuel cell assembly 10 therefore has a high concentration of $CO_2$, permitting the $CO_2$ gas to be more easily and efficiently recovered for disposal or for conversion to a usable form.

Flue gas depleted of $CO_2$ is then output from the cathode 12 through a cathode outlet 12B to line 18 (e.g., cathode outlet line). The anode exhaust gas containing predominantly $CO_2$ as well as unreacted hydrogen, CO, water vapor, and trace amounts of other gases, on the other hand, is output from the anode 14 through an anode outlet 14B to line 20 (e.g., anode outlet line) and is conveyed by the line 20 for further processing. Due, in part, to the high concentration of $CO_2$, the processing may include more efficient sequestration or segregation of at least a portion of the $CO_2$ in the gas in the line 20.

Because the cathode and anode gases are output from the first fuel cell assembly 10 at high temperature, at least a portion of the sensible heat from these streams is recovered by heat recovery units ("HRUs"). A first HRU 17 is configured to receive cathode exhaust in the line 18 and transfer heat from the cathode exhaust to another portion of the system 1 or for export from the system 1. A second HRU 19 is configured to receive anode exhaust in the line 20 and transfer heat from the anode exhaust to another portion of the system 1 or for export from the system 1. The first HRU 17 may be similar to or substantially the same as an economizer section of a fossil fuel power plant boiler or heat recovery steam generator ("HRSG"). According to an exemplary embodiment, the first HRU 17 may be integrated with the power plant equipment, for example, when applied to existing power plants. Recovery of the heat may be desirable to maximize efficiency and minimize $CO_2$ emissions per kWh of power produced.

Figure 2:
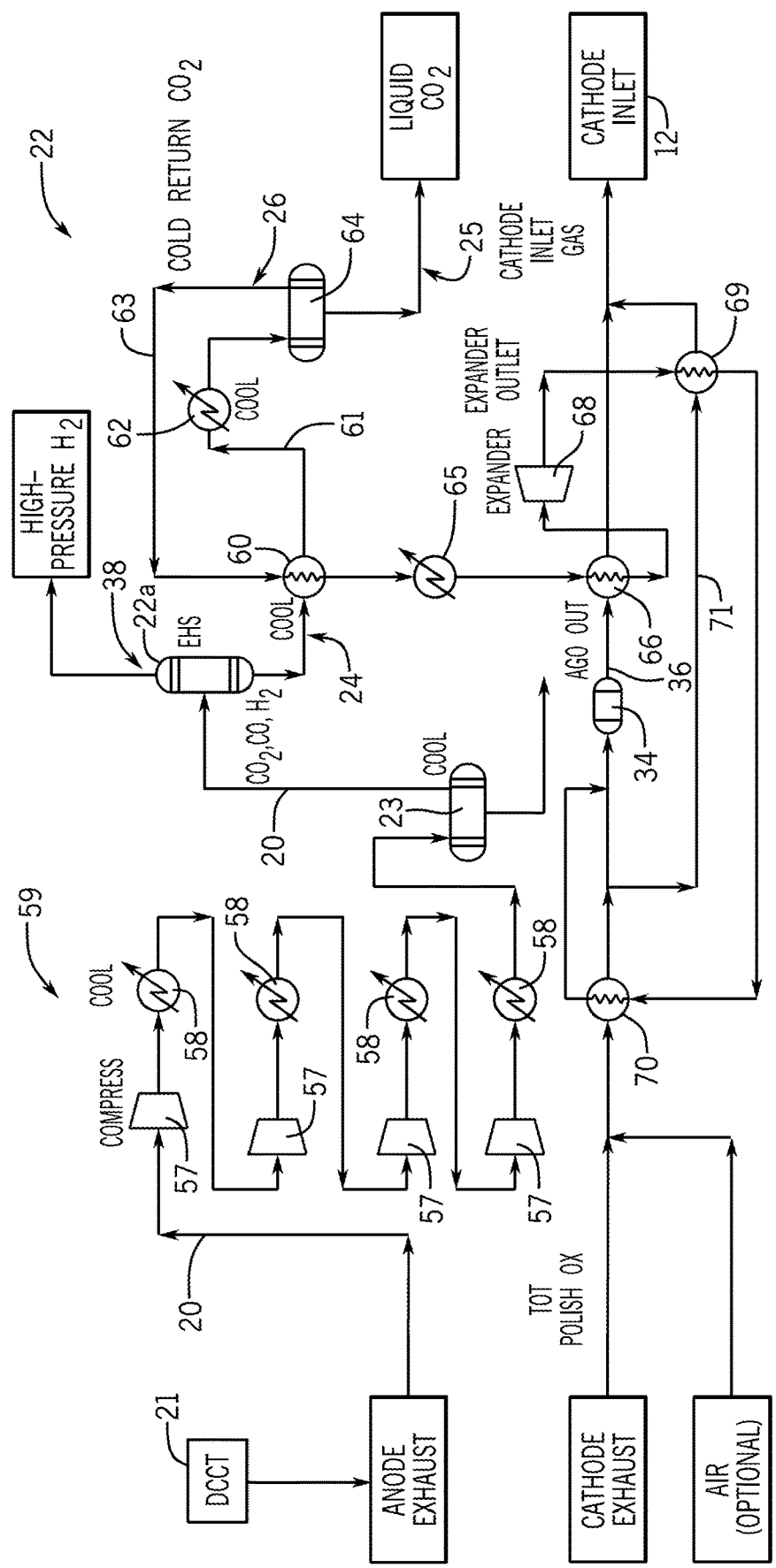
FIG. 2 shows a schematic view of a $CO_2$ purification/liquefaction system, according to one embodiment.

Referring still to FIG. 1, the system 1 is shown for processing the anode exhaust gas, according to an exemplary embodiment. The anode exhaust gas is carried by line 20 to a direct contact cooling tower ("DCCT") 21, configured to bring the anode exhaust gas into direct contact with cooling water, which cools the anode exhaust gas, condensing the water as the gas is cooled and separating the water from the anode exhaust gas in a single step. According to other exemplary embodiments the anode exhaust gas may be fed through other devices for separating and/or removing water. Referring now to FIGS. 1 and 2, after at least a portion of the water in the anode exhaust gas is removed, the anode exhaust gas is passed further along line 20 to a $CO_2$ separator system 22. The $CO_2$ separator system 22 includes an electrochemical hydrogen separator ("EHS") 22a, where most or all of the hydrogen gas in the anode exhaust is separated from the other gases in the exhaust and output to a line (e.g., hydrogen output line). Prior to being received at the EHS 22a, the anode exhaust gas may be subject to a sequence of cooling and shifting, such that at least a portion of the CO in the anode exhaust gas is shifted (i.e., converted) to $H_2$ and $CO_2$ and that substantially all of the water remaining in the anode exhaust gas after passing through the DCCT 21 is condensed to a liquid phase, such that the water may be readily removed by a first liquid-vapor separator ("LVS") 23 (e.g., a condensate knock-out pot). Referring to FIG. 2, cooled and shifted anode exhaust gas is compressed and cooled along line 20 through a plurality of compressors 57 and heat exchangers 58. These compressors 57 and heat exchangers 58 may collectively form a compression system 59.

After passing through the compression system 59 and before being received at the EHS 22a, any condensed water in the anode exhaust gas is received by the first LVS 23, where at least a portion (e.g., all) of any remaining water is removed from the anode exhaust gas. The water may be fed to other portions of the system 1 or may be exported from the system 1 for other uses. The remaining partially-cooled anode exhaust gas is then fed to the EHS 22a. By removing water from the exhaust stream, the concentration of $CO_2$ in the remaining anode exhaust stream is increased, making separation easier in the EHS 22a.

The EHS 22a separates out high-pressure, high-purity hydrogen stream as a first EHS output stream 38. The removal of hydrogen increases the concentration of $CO_2$ in the remaining gas in the EHS 22a from approximately 65-75% $CO_2$ to over 90% $CO_2$, which allows the $CO_2$ to be condensed and liquefied at a higher temperature with less or no refrigeration (e.g., no refrigeration may be required during startup or operation on a cold day) than if the hydrogen in the anode exhaust gas fed to the EHS 22a were still present. This remaining gas is output from the EHS 22a as a second EHS output stream 24 and includes a relatively high concentration of $CO_2$ at the same high pressure. The second EHS output stream 24 may also include small amounts of hydrogen, CO, and $CH_4$.

Figure 3:
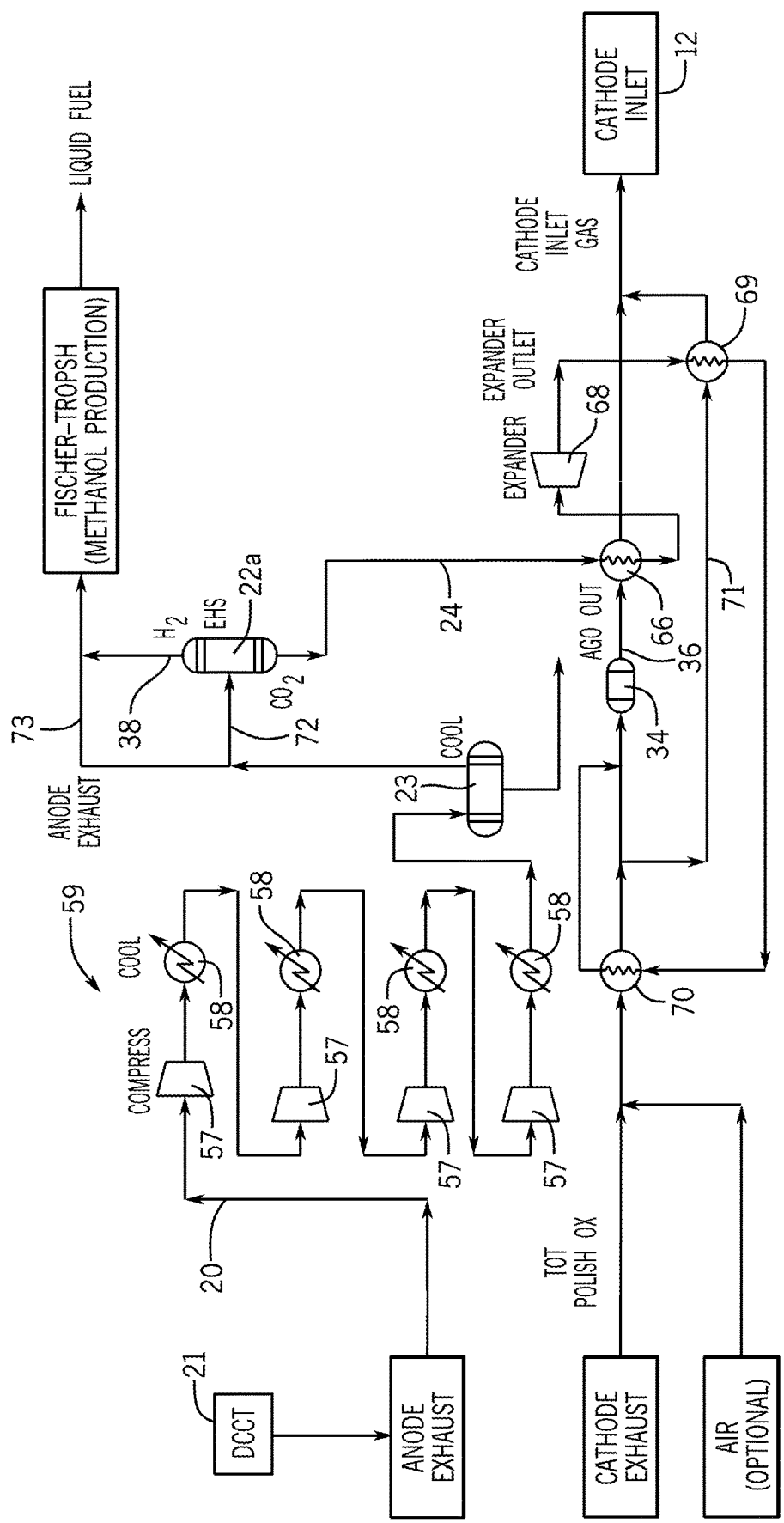
FIG. 3 shows a schematic view of a system for $CO_2$ capture, reacting $H_2$ and $CO_2$ to produce liquid fuel.

While FIGS. 2 and 3 show the EHS 22a disposed downstream from the compression system 59, according to other exemplary embodiments, the EHS 22a may be disposed upstream from the compression system 59. For example, by separating out hydrogen prior to compressing the anode exhaust, the amount of compression power required may be substantially reduced. In this configuration, hydrogen output from the EHS 22a will be at lower pressure than when the EHS 22a is disposed downstream from the compression system 59.

The second EHS output stream 24 is fed through line 61 through a first heat exchanger 60 and a second heat exchanger 62 (e.g., heater), each configured to cool the second EHS output stream 24 and to condense $CO_2$ into liquid to generate a cooled gas/liquid mixture. The second heat exchanger 62 may be configured to transfer heat from the second EHS output stream 24 to a refrigeration system to condense more of the $CO_2$ from the stream. The cooled gas/liquid mixture forming the second EHS output stream 24 is fed from line 61 to a second LVS 64 (e.g., a condensate knock-out pot) configured to separate out liquid $CO_2$ from the remaining vapor stream. The condenser outputs a stream of liquid $CO_2$ as a first LVS output stream 25 and a separate remaining vapor stream as a second LVS output stream 26, which is then fed through line 63 for reheating. By cooling the $CO_2$ stream at pressure, liquid $CO_2$ is produced by condensation, which can be accomplished with minimal or zero refrigeration. For example, the liquid $CO_2$ may be pumped to a very high pressure with very low power input to the system 1. The very high pressure value of the $CO_2$ may improve transportation and/or sequestration of the $CO_2$. As shown in FIG. 1, the first LVS output stream 25 may be received at a sequestration processing assembly 51 where the first LVS output stream 25 is disposed of or converted to a usable form. For example, $CO_2$ gas may be disposed of by deploying it into a deep saline formation or depleted oil and gas wells. $CO_2$ gas may also be used in other processes such as enhanced oil recovery. The remaining gases forming the second LVS output stream 26 include mostly uncondensed (e.g., non-condensable) $CO_2$, hydrogen, $CH_4$, and CO.

Referring again to FIG. 2, line 63 passes through the first heat exchanger 60. As the second LVS output stream 26 is passed through the first heat exchanger 60, heat is transferred from the second EHS output stream 24 to the second LVS output stream 26, generating a partially-heated (i.e., heated) second LVS output stream 26 and cooling stream in line 61. This loop, including lines 61 and 63 and the first heat exchanger 60 minimizes the net cooling required in the system 1. The partially-heated second LVS output stream 26 is then passed through a third heat exchanger 65 (e.g., heater). The third heat exchanger 65 is configured to further heat the second LVS output stream 26 in order to maximize the power generated by an expander 68, as will be discussed in further detail below. High-level heat (e.g., at a higher temperature than lower-level heat) from the system 1 is transferred through a fourth heat exchanger 66 to gas fed to the expander 68. However, in some embodiments the amount of high-level heat that may be transferred may be limited, such that transferring lower-level heat through the third heat exchanger, from the system 1 to the partially-heated second LVS output stream 26 may increase the overall operational efficiency of the system 1.

The heated second LVS output stream 26 output from the third heat exchanger 65 is then fed through a fourth heat exchanger 66. Referring to FIGS. 1 and 2, the system 1 may include an anode gas oxidizer ("AGO") combustor 34. The AGO combustor 34 is configured to receive the expanded second LVS output stream 26, cathode exhaust gas from the cathode 12 or another cathode in the system 1, and/or air from an air supply 30 The AGO combustor 34 oxidizes the second LVS output stream 26 and outputs an AGO outlet stream 36 at a very high temperature which may be used to maximize the temperature of the gas fed to the expander 68. The AGO output stream 36 includes nitrogen, oxygen, and $CO_2$ and is then fed to the cathode 12 of the first fuel cell assembly 10 after being cooled in heat exchanger 66.

Referring to FIG. 2, the fourth heat exchanger 66 is configured to transfer heat between the fuel cell assemblies 10, 110 and the second LVS output stream 26. For example, the fourth heat exchanger 66 may transfer waste heat from cathode exhaust gas from the fuel cell assemblies 10, 110 to the second LVS output stream 26, further heating the second LVS output stream 26 Heat generated from oxidization in the AGO combustor 34 may also be transferred to the second LVS output stream 26 in the fourth heat exchanger 66. The second LVS output stream 26 is then fed through an expander 68, which outputs an expanded second LVS output stream 26. The expander 68 is configured to recovery energy in the second LVS output stream 26, such that the expander 68 offsets power required for compression at other points in the cycle (e.g. at compressors 57). According to an exemplary embodiment, using high-temperature cathode exhaust gas as the oxidizing medium in the AGO combustor 34 increases the temperature of the gas from the AGO combustor 34 to the fourth heat exchanger 66, such that the gas fed to the expander 68 is heated to a higher temperature, thereby maximizing the energy recovered from the expander 68.

Before the expanded second LVS outlet stream 26 is mixed with air from the air supply 30 and the cathode exhaust gas, the second LVS output stream 26 may be passed through a fifth heat exchanger 69 and a sixth heat exchanger 70. In each of the fifth and sixth heat exchangers 69, 70, heat is transferred to the second LVS output stream 26 from the mixture of the cathode exhaust and air. By preheating the second LVS output stream 26 fed to the AGO combustor 34, the outlet temperature of the AGO combustor 34 is increased, thereby increasing the temperature of the gas being fed to the expander 68. At least a portion of the air and/or cathode exhaust may bypass the AGO combustor 34 through an AGO bypass line 71. Heat is further transferred through the fifth heat exchanger 69 from the bypass line 71 to the second LVS output stream 26, further heating the second LVS output stream 26 prior to being fed to the AGO combustor 34. This bypass increases the inlet temperature and therefore the outlet temperature of the AGO combustor 34. Accordingly, the heat transfer further increases the inlet temperature at the expander 68, maximizing energy recovery in the expander 68, as described above.

As an example of the system 1 shown in FIG. 2, a heat and material balance was performed for a power and carbon capture assembly without external flue gas sources. This balance is summarized in Tables 1-3, provided below. Although the balance shows only 10% of the $CO_2$ from the anode exhaust being captured, this proportion equates to approximately 30% of the $CO_2$ normally emitted from a power generation system. The amount of $CO_2$ liquefied can be readily increased by reducing the condensation temperature and increasing the refrigeration duty required. For this example, which has no external flue gas supplying the first fuel cell assembly 10, a higher $CO_2$ capture would impair the operation of the first fuel cell assembly 10 by supplying insufficient $CO_2$ to the cathode 12 for proper operation. While Tables 1-3 show that the power required to compress the anode exhaust gas is expected to be approximately 80 kW in this case, the power produced by the expander is approximately 70 kW, such that the net power consumption is approximately 10 kW, which is very low.

It should be recognized that adding $CO_2$ from the flue gas of a power plant or other fuel cell power generator may increase the amount of $CO_2$ captured in the system 1, without starving the power generation carbon capture assembly of $CO_2$. This additional $CO_2$ added to the cathode inlet 12A will have no or little impact on the compression system but will lower the expander power output due to a lower flow rate to the expander.

TABLE 1

Heat and Material Balance

|  | Fuel Supply 16 | Shifted and Cooled Anode Exhaust to Compression 59 | First EHS Output Stream (Hydrogen) 38 |
|---|---|---|---|
| Molar flow lbmol/hr | 10.80 | 39.10 | 7.20 |
| Mass flow lb/hr | 294.0 | 1,317.1 | 15.4 |
| Temp F. | 75° | 103° | 100° |
| Pres psia | 30.00 | 14.90 | 900.00 |
| IWCg | 423.60 | 5.62 | 24,504.48 |
| Enth MMBtu/hr | −0.939 | −4.967 | −0.005 |
| Vapor mole fraction | 1.000 | 1.000 | 0.994 |
| SCFM | 68.28 | 247.28 | 45.56 |
| Average mol wt | 27.23 | 33.69 | 2.13 |
| Actual dens lb/ft3 | 0.1432 | 0.0833 | 0.3115 |
| Actual vol ft3/min | 34.21 | 263.52 | 0.82 |
| Cp Btu/lbmol-F | 8.90 | 8.65 | 18.02/6.75 |
| Cp/Cv | 1.297 | 1.303 | 1.4336 Vap |
| Z factor | 0.9944 | 0.9974 | 1.0328 Vap |
| Visc cP | 0.0133 | 0.0158 | 0.7155/0.009273 |
| Th cond Btu/hr-ft-F | 0.0150 | 0.0210 | 0.36/0.1046 |

| Components | lb-mole/hr | mole % | lb-mole/hr | mole % | lb-mole/hr | mole % |
|---|---|---|---|---|---|---|
| Hydrogen | 0.00 | 0.00 | 9.17 | 23.45 | 7.15 | 99.26 |
| Methane | 6.48 | 60.00 | 0.02 | 0.05 | 0.00 | 0.00 |
| Carbon Monoxide | 0.00 | 0.00 | 0.03 | 0.07 | 0.00 | 0.00 |
| Carbon Dioxide | 4.32 | 40.00 | 29.09 | 74.41 | 0.00 | 0.00 |
| Water | 0.00 | 0.00 | 0.50 | 1.28 | 0.05 | 0.74 |

TABLE 1-continued

Heat and Material Balance

| | | | | | | |
|---|---|---|---|---|---|---|
| Nitrogen | 0.00 | 0.00 | 0.29 | 0.75 | 0.00 | 0.00 |
| Oxygen | 0.00 | 0.00 | 0.00 | 0.00 | 0.00 | 0.00 |
| Total | 10.53 | 100.00 | 39.10 | 100.00 | 7.20 | 100.00 |
| Carbon, m/hr | 10.80 | | 29.14 | | 0.00 | |

| | First LVS Output Stream 25 (Liquid $CO_2$ to Sequestration) | Inlet to Expander 68 | Outlet from Expander 68 |
|---|---|---|---|
| Molar flow lbmol/hr | 3.14 | 28.30 | 28.30 |
| Mass flow lb/hr | 136.8 | 1,156.7 | 1,156.7 |
| Temp F. | 61° | 1455° | 736° |
| Pres psia | 900.00 | 898.00 | 20.00 |
| IWCg | 24,504.48 | 24,449.12 | 146.78 |
| Enth MMBtu/hr | −0.539 | −3.965 | −4.210 |
| Vapor mole fraction | 0.000 | 1.000 | 1.000 |
| SCFM | 19.89 | 178.98 | 178.98 |
| Average mol wt | 43.51 | 40.87 | 40.87 |
| Actual dens lb/ft3 | 49.8548 | 1.7543 | 0.0637 |
| Actual vol ft3/min | 0.05 | 10.99 | 302.64 |
| Cp Btu/lbmol-F | 46.17 | 12.76 | 11.18 |
| Cp/Cv | | 1.195 | 1.217 |
| Z factor | | 1.0184 | 1.0002 |
| Visc cP | 0.0781 | 0.0422 | 0.0298 |
| Th cond Btu/hr-ft-F | 0.0498 | 0.0485 | 0.0312 |

| Components | lb-mole/hr | mole % | lb-mole/hr | mole % | lb-mole/hr | mole % |
|---|---|---|---|---|---|---|
| Hydrogen | 0.03 | 1.08 | 1.98 | 7.01 | 1.98 | 7.01 |
| Methane | 0.00 | 0.03 | 0.02 | 0.07 | 0.02 | 0.07 |
| Carbon Monoxide | 0.00 | 0.02 | 0.02 | 0.09 | 0.02 | 0.09 |
| Carbon Dioxide | 3.10 | 98.62 | 25.99 | 91.83 | 25.99 | 91.83 |
| Water | 0.00 | 0.00 | 0.00 | 0.00 | 0.00 | 0.00 |
| Nitrogen | 0.01 | 0.25 | 0.28 | 1.01 | 0.28 | 1.01 |
| Oxygen | 0.00 | 0.00 | 0.00 | 0.00 | 0.00 | 0.00 |
| Total | 3.14 | 100.00 | 28.30 | 100.00 | 28.30 | 100.00 |
| Carbon, m/hr | 3.10 | | 26.03 | | 26.03 | |

| | Gas Returned to Cathode Inlet 12A | Cathode Outlet 12B to AGO Combustor 34 | Supplemental Air |
|---|---|---|---|
| Molar flow lbmol/hr | 111.49 | 78.82 | 5.38 |
| Mass flow lb/hr | 3,624.3 | 2,313.1 | 154.5 |
| Temp F. | 833° | 1141° | 74° |
| Pres psia | 14.70 | 16.18 | 14.70 |
| IWCg | 0.00 | 41.18 | 0.00 |
| Enth MMBtu/hr | −5.617 | −1.046 | −0.006 |
| Vapor mole fraction | 1.000 | 1.000 | 1.000 |
| SCFM | 705.16 | 498.52 | 34.00 |
| Average mol wt | 32.51 | 29.35 | 28.74 |
| Actual dens lb/ft3 | 0.0344 | 0.0276 | 0.0738 |
| Actual vol ft3/min | 1755.98 | 1396.82 | 34.89 |
| Cp Btu/lbmol-F | 8.82 | 8.24 | 7.01 |
| Cp/Cv | 1.291 | 1.317 | 1.398 |
| Z factor | 1.0003 | 1.0004 | 0.9998 |
| Visc cP | 0.0328 | 0.0386 | 0.0181 |
| Th cond Btu/hr-ft-F | 0.0301 | 0.0365 | 0.0147 |

| Components | lb-mole/hr | mole % | lb-mole/hr | mole % | lb-mole/hr | mole % |
|---|---|---|---|---|---|---|
| Hydrogen | 0.00 | 0.00 | 0.00 | 0.00 | 0.00 | 0.00 |
| Methane | 0.01 | 0.01 | 0.01 | 0.01 | 0.00 | 0.00 |
| Carbon Monoxide | 0.00 | 0.00 | 0.00 | 0.00 | 0.00 | 0.00 |
| Carbon Dioxide | 33.66 | 30.19 | 7.63 | 9.68 | 0.00 | 0.00 |
| Water | 5.92 | 5.31 | 3.84 | 4.88 | 0.05 | 1.01 |
| Nitrogen | 66.43 | 59.58 | 61.94 | 78.58 | 4.21 | 78.25 |
| Oxygen | 5.47 | 4.90 | 5.40 | 6.85 | 1.11 | 20.74 |
| Total | 111.49 | 100.00 | 78.82 | 100.00 | 5.38 | 100.00 |
| Carbon, m/hr | 33.67 | | 7.64 | | 0.00 | |

TABLE 2

Power Consumption in System

| | Compressor | Expander | Net Consumption |
|---|---|---|---|
| Efficiency | 75% | 80% | |
| Power Consumption (kW) | 82.8 | −71.6 | 11.3 |

TABLE 3

System Output Coproduction

| | | |
|---|---|---|
| H2 Coproduction | 369.0 | lb/day |
| CO2 Coproduction | 3,283 | lb/day |
| % CO2 Recovery | 10.7% | of Anode Exhaust |
| | 28.7% | of Feed Gas |

Referring now to FIG. 3, $CO_2$ from the anode exhaust gas may be reacted with hydrogen to generate liquid fuel using a Fischer-Tropsh or other liquid-fuel production assembly, according to an exemplary embodiment. In these reaction systems, it may be desirable to have an optimum hydrogen-to-$CO_2$ ratio configured to maximize the yield of liquid fuel generated by the system 1. This ratio may be controlled, at least in part, by mixing anode exhaust gas having a high concentration of $CO_2$ with hydrogen. As shown in FIG. 3, a first portion 72 of the anode exhaust gas is received at the EHS22a. The EHS 22a then separates the first portion 72 of the anode exhaust gas in substantially the same way as described with respect to FIGS. 1 and 2, generating a first EHS output stream 38, hydrogen, and a second EHS output stream 24, mostly $CO_2$. A second portion 73 of the anode exhaust gas and the first EHS output stream 38 are received in a Fischer-Tropsh or other liquid-fuel production assembly, which is configured to generate and output a liquid fuel (such as methanol). The anode exhaust gas may be supplied to the EHS 22a to generate an optimum $H_2/CO_2$ ratio required for liquid synthesis. FIG. 3 shows the entire second EHS output stream 24 being fed directly from the EHS to the fourth heat exchanger 66. However, according to other exemplary embodiments, the second EHS output stream 24 may be passed through a loop including first, second, and third heat exchangers 60, 62, 65, and a LVS 64, as described with respect to FIG. 2.

Referring again to FIG. 1, the system 1 may further include the second fuel cell assembly 110 (e.g., an internally-reforming direct molten carbonate fuel cell) in addition to or in place of a standard power plant. According to an exemplary embodiment, the second fuel cell assembly 110 may be substantially the same as the first fuel cell assembly 10. For example, the second fuel cell assembly 110 includes a cathode 112 and an anode 114. Fuel from a supply 116 is delivered through a line 115 to an inlet 114A of the anode 114. Anode exhaust gas is then output from the anode outlet 114B and fed to a second AGO combustor 134, which is also supplied with air from an air supply 108. The output from the combustor 134 is fed to an inlet 112A of the cathode 112. Cathode exhaust gas is output from an outlet 112B of the cathode 112 and into line 118. The cathode exhaust gas includes at least nitrogen, O2 and $CO_2$. According to an exemplary embodiment, the cathode exhaust gas may be untreated because there are no contaminants in the cathode exhaust. The hot cathode exhaust gas in line 118 may be mixed with the AGO output stream 36 from the AGO combustor 34 as well as the flue exhaust gas in line 8. A portion of the hot cathode exhaust gas may be mixed with the feed gas to the AGO combustor 34 to produce a higher exit temperature from the AGO combustor 34 for heating the expander 68 in the gas, as shown in FIG. 2. The combined gases may then be fed into the inlet 12A of the cathode 12 of the first fuel cell assembly 10. The presence of $CO_2$ in the flue gas from the power plant 6 increases the amount of $CO_2$ that can be exported from the anode 14 of the first fuel cell assembly 10 without starving the cathode 12 of the first fuel cell assembly 10 of the amount of $CO_2$ required for proper operation of the first fuel cell assembly 10.

As can be appreciated, the system 1 as shown in FIG. 1 may be further modified depending on the fossil fuel being processed by the fossil fuel power plant 6, and on the relative size of the power plant 6 and the first fuel cell assembly 10. For example, the proper sizing of the power cycles between the fossil fuel power plant 6 and the first fuel cell assembly 10 may allow for efficient power production from fossil fuels combined with isolation of more than two thirds of the $CO_2$ present in the fossil fuel.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the claims. For example, the heat recovery heat exchangers may be further optimized.

What is claimed is:

1. A carbon dioxide capture system comprising:
   a fuel cell assembly comprising an anode section and a cathode section;
   an electrochemical hydrogen separator (EHS) configured to receive an anode exhaust stream from the anode section of the fuel cell assembly, to generate a first EHS output stream comprising hydrogen, and to generate a second EHS output stream comprising concentrated carbon dioxide; and
   a liquid-vapor separator (LVS) configured to receive the second EHS output stream, and separate the second EHS output stream into a first LVS output stream comprising liquid carbon dioxide, and a second LVS output stream comprising non-condensable gas and carbon dioxide vapor;
   wherein the anode exhaust stream is compressed before being received by the EHS, such that the first EHS output stream comprises high pressure hydrogen and the second EHS output stream comprises high pressure concentrated carbon dioxide.

2. The carbon dioxide capture system according to claim 1, further comprising:
   a first heat exchanger configured to receive the second EHS output stream and the second LVS output stream, to cool the second EHS output stream, and to heat the second LVS output stream; and
   a second heat exchanger configured to receive the cooled second EHS output stream from the first heat exchanger and to further cool the second EHS output stream;
   wherein the LVS is configured to receive the cooled second EHS output stream from the second heat exchanger.

3. The carbon dioxide capture system according to claim 2, further comprising:
   a third heat exchanger configured to receive the heated second LVS output stream from the first heat exchanger and to further heat the second LVS output stream.

4. The carbon dioxide capture system according to claim 3, further comprising:
   a fourth heat exchanger configured to receive the heated second LVS output stream from the third heat exchanger and further heat the second LVS output stream.

5. The carbon dioxide capture system according to claim 4, further comprising an expander configured to expand the heated second LVS output stream.

6. The carbon dioxide capture system according to claim 5, further comprising an anode gas oxidizer (AGO) combustor configured to receive the expanded second LVS output stream, oxidize the expanded second LVS output stream, and provide an AGO output stream to the cathode section of the fuel cell assembly.

7. The carbon dioxide capture system according to claim 6, wherein the AGO combustor is configured to receive a cathode exhaust stream from the fuel cell assembly.

8. The carbon dioxide capture system according to claim 7, wherein:
   the fourth heat exchanger is configured to further heat the second LVS output stream using the AGO output stream.

9. A carbon dioxide capture system comprising:
   a fuel cell assembly comprising an anode section and a cathode section;
   an electrochemical hydrogen separator (EHS) configured to receive an anode exhaust stream from the anode section of the fuel cell assembly, to generate a first EHS output stream comprising hydrogen, and to generate a second EHS output stream comprising concentrated carbon dioxide; and
   a liquid-vapor separator (LVS) configured to receive the second EHS output stream, and separate the second EHS output stream into a first LVS output stream comprising liquid carbon dioxide, and a second LVS output stream comprising non-condensable gas and carbon dioxide vapor;
   further comprising a plurality of compressors and a plurality of heat exchangers that are alternately disposed and configured to receive the anode exhaust stream from the anode section of the fuel cell assembly, and to compress and cool the anode exhaust stream before the anode exhaust stream is received by the EHS.

10. A liquid fuel generation system comprising:
    a fuel cell assembly comprising an anode section and a cathode section;
    an electrochemical hydrogen separator (EHS) configured to receive a first portion of an anode exhaust stream from the anode section of the fuel cell assembly, to generate a first EHS output stream comprising high pressure hydrogen, and to generate a second EHS output stream comprising high pressure concentrated carbon dioxide;
    a liquid fuel production assembly configured to receive a second portion of the anode exhaust stream and the first EHS output stream, and generate a liquid fuel; and
    a heat exchanger configured to heat the second EHS output stream.

11. The liquid fuel generation system according to claim 10, further comprising an expander configured to expand the heated second EHS output stream.

12. The liquid fuel generation system according to claim 11, further comprising an anode gas oxidizer (AGO) combustor configured to receive the expanded second EHS output stream, oxidize the expanded EHS output stream, and provide an AGO output stream to the cathode section of the fuel cell assembly.

13. The liquid fuel generation system according to claim 12, wherein the AGO combustor is configured to receive a cathode exhaust stream from the fuel cell assembly.

14. The liquid fuel generation system according to claim 13, wherein the heat exchanger is configured to heat the second LVS output stream using the AGO output stream before the second LVS output stream is sent to an expander.

15. The liquid fuel generation system according to claim 10, further comprising a plurality of compressors and a plurality of heat exchangers that are alternately disposed and configured to receive the anode exhaust stream from the anode section of the fuel cell assembly, and compress and cool the anode exhaust stream before the anode exhaust stream is received by the EHS.

16. A carbon dioxide capture system comprising:
    a fuel cell assembly comprising an anode section and a cathode section;
    an electrochemical hydrogen separator (EHS) configured to receive an anode exhaust stream from the anode section of the fuel cell assembly, to generate a first EHS output stream comprising hydrogen, and to generate a second EHS output stream comprising concentrated carbon dioxide; and a liquid-vapor separator (LVS) configured to receive the second EHS output stream, and separate the second EHS output stream into a first LVS output stream comprising liquid carbon dioxide, and a second LVS output stream comprising non-condensable gas and carbon dioxide vapor;

further comprising a plurality of compressors and a plurality of heat exchangers that are alternately disposed and configured to receive the anode exhaust stream from the anode section of the fuel cell assembly, and to compress and cool the anode exhaust stream after the anode exhaust stream is received by the EHS.

* * * * *